United States Patent [19]

Valentine et al.

[11] Patent Number: 5,068,663

[45] Date of Patent: Nov. 26, 1991

[54] MOTOR VEHICLE RADAR DETECTOR INCLUDING AMPLITUDE DETECTION

[75] Inventors: Michael D. Valentine; Stephen R. Scholl; Marwan E. Nusair, all of Cincinnati, Ohio

[73] Assignee: Valentine Research, Inc., Cincinnati, Ohio

[21] Appl. No.: 645,587

[22] Filed: Jan. 24, 1991

[51] Int. Cl.$^5$ .............................................. G01S 7/42
[52] U.S. Cl. ...................................................... 342/20
[58] Field of Search .................. 342/20; 455/226, 228, 455/315

[56] References Cited

U.S. PATENT DOCUMENTS

| | | | |
|---|---|---|---|
| 2,470,843 | 5/1949 | Boothroyd et al. | 250/20 |
| 2,977,465 | 3/1961 | Sanders, Jr. et al. | 250/20 |
| 3,201,696 | 8/1965 | Sharp | 325/423 |
| 4,315,261 | 2/1982 | Mosher | 343/18 E |
| 4,581,769 | 4/1986 | Grimsley et al. | 455/226 |
| 4,613,989 | 9/1986 | Fende | 455/351 |
| 4,622,553 | 11/1986 | Baba et al. | 342/91 |
| 4,626,857 | 12/1986 | Imazeki | 342/20 |
| 4,630,054 | 12/1986 | Martinson | 342/20 |
| 4,668,952 | 5/1987 | Imazeki et al. | 342/20 |
| 4,686,499 | 8/1987 | Furnish | 333/230 |
| 4,698,632 | 10/1987 | Baba et al. | 342/17 |
| 4,709,407 | 11/1987 | Baba | 455/226 |
| 4,750,215 | 6/1988 | Biggs | 455/226 |
| 4,862,175 | 8/1989 | Biggs | 342/20 |
| 4,954,828 | 9/1990 | Orr | 342/20 |

Primary Examiner—Mark Hellner
Attorney, Agent, or Firm—Killworth, Gottman, Hagan & Schaeff

[57] ABSTRACT

A radar detector for use in a motor vehicle employs amplitude detection to sense the presence of radar signals commonly used to monitor the speed of such motor vehicles. Amplitude signals are generated by down-converting received signals using a series of mixers, one of which is swept to insure signal detection, and compared to a threshold which is controlled such that noise is detected by the comparison on average a selected period of time. Detected amplitude signals must persist for a given period of time before they are considered to be potentially valid radar signals. After passing the first test of persistence, the signals are verified by means of frequency modulating the first of the series of mixers, detecting the frequency modulation and correlating the detected frequency modulation to determine whether the signal is valid and if so, to which radar frequency band the signal belongs. A first embodiment of the radar detector monitors the X band (10.475-10.575 Ghz), the Ku band (13.400-13.500 Ghz), the K band (24.025-24.275 Ghz), and the Ka band (34.200-35.200 Ghz) and a second embodiment monitors all of these radar signal bands plus and expanded Ka band (34.200-35.200 Ghz).

36 Claims, 2 Drawing Sheets

MOTOR VEHICLE RADAR DETECTOR INCLUDING AMPLITUDE DETECTION

BACKGROUND OF THE INVENTION

The present invention relates generally to motor vehicle radar detectors and, more particularly, to radar detectors which provide improved sensitivity and a satisfactory level of "false alarms" by means of signal amplitude detection.

Radar signals have been commonly used by police for some time to determine the speed of motor vehicles. In response to radar speed monitoring and to signal motor vehicle operators when such monitoring is taking place, police radar detectors have likewise been used for almost a coincident period of time. Radar detectors sense radar signals and alert motor vehicle operators of their presence by audible and/or visual alarms. To ensure that radar detectors advise operators of radar monitoring operations at the earliest possible time, the detectors must be sufficiently sensitive to detect weak radar signals transmitted from as great a distance as possible. It is also important to minimize the number of "false alarms", i.e. alarms generated in response to signals/noise other than speed monitoring radar signals, produced by radar detectors such that an operator can rely on radar alerting signals generated by the detector. Unfortunately, detection of weak signals and minimizing false alarms present conflicting goals.

Currently available police radar detectors typically employ swept superheterodyne receivers which include FM discriminators whose output signals are filtered and passed to voltage comparators to detect the presence of radar signals. In an attempt to achieve both the weak signal detection and low false alarm goals, elaborate filters have been used that are matched to the "s-shape" of the detected FM signal which is generated as the signal sweeps through the intermediate frequency (IF) amplifier. Another approach is to perform digital signal processing on the output signal from the discriminator to improve post-discriminator dynamic range. Unfortunately, all known approaches tend to be complex and expensive and the detectors still are made up of an FM discriminator, a filter which is possibly complex and circuitry to finally make a radar signal present or no radar signal present decision.

Further, all such known detectors also employ an inordinately wide IF bandwidth in comparison to desired matched filter considerations, possibly due to signal detection considerations. While matched filter bandwidth is approximately the square root of the sweep rate of the swept superheterodyne receiver, known detectors use a substantially wider IF bandwidth. With wider IF bandwidth, the "s-curve" persists for a relatively longer period of time and therefore its energy is concentrated at lower frequencies making it easier to detect in the presence of broadband noise from the discriminator. Conversely, as the IF bandwidth is narrowed the "s-curve" occurs faster occupying a wider bandwidth, and is progressively more difficult to detect in the presence of noise occupying a similar bandwidth. Further confounding the recognition task is the fact that the desired "s-curve" is a bipolar signal buried in bipolar noise. Still another difficulty is the inherent nature of the FM limiter/discriminator: improving input signal strength is not manifested solely by increased output signal amplitude but also by suppression of the noise component. Recognizing improved signal to noise ratio arising from suppressed noise is a complex task tending to require expensive hardware.

Accordingly, there is a need for an improved radar detector which operates effectively with IF bandwidth more closely approximating the matched filter bandwidth and which overcomes the foregoing problems associated with conventional radar detector techniques utilizing FM discriminators whose output signals are filtered and passed to voltage comparators or other circuitry to detect the presence of radar signals.

SUMMARY OF THE INVENTION

This need is met by an improved radar detector in accordance with the present invention wherein amplitude detection rather than frequency discrimination is employed to detect the presence of radar signals. Amplitude detection is advantageous in that radar signal presence occurs as a unipolar pulse generated as the signal is swept through the IF amplifier. A unipolar pulse is easier to detect with a voltage comparator than the bipolar "s-curve" of the FM discriminator. Improving signal strength is also manifested by a larger detector output rather than suppression of the noise component, again easing the radar signal detection. These properties of amplitude detection permit the IF amplifier bandwidth to be narrowed toward the desired matched filter bandwidth thus reducing the noise power in the IF amplifier. Of course, amplitude detection also creates a number of problems which are overcome in accordance with the present invention. Included within the problems presented and overcome are: implementation of amplitude detectors having wide dynamic range; coping with changing noise power presented to the amplitude detector as the receiver is swept; achieving sensitivity without generating undue false alarms; and, setting a decision voltage for signal detection to effect a suitable compromise between sensitivity to received signals and immunity to the noise in which the signals are embedded.

In accordance with one aspect of the present invention, a motor vehicle radar signal detector for alerting an operator of a motor vehicle receiving incoming radar signals comprises receiver means for receiving incoming radar signals at frequencies within at least one frequency band. Radar signal processing means responsive to the incoming radar signals is provided for generating a final intermediate frequency signal within a final intermediate frequency range. The radar signal processing means comprises variable frequency mixer means including a local oscillator for generating a local oscillator signal which is swept across a frequency range corresponding to the at least one frequency band. Amplitude detection means receives the final intermediate frequency signal for generating a signal strength signal representative of the amplitude of the final intermediate frequency signal. Signal verification means responsive to the signal strength signal identifies valid incoming radar signals. Finally, alarm means is provided for alerting an operator of a motor vehicle upon identification of valid incoming radar signals.

The radar signal processing means further comprises first mixer means for converting the incoming radar signals to a first intermediate frequency signal having a frequency within a first intermediate frequency range. The first intermediate frequency signal is mixed with the swept local oscillator signal by the variable frequency mixer means to generate a swept intermediate frequency signal having a frequency within a second intermediate frequency range. The swept intermediate frequency signal is converted to the final intermediate frequency signal by second mixer means.

In accordance with another aspect of the present invention, a motor vehicle radar signal detector for alerting an operator of a motor vehicle receiving incoming radar signals comprises receiver means for receiving incoming radar signals at frequencies within at least one frequency band. First mixer means is provided for converting the incoming radar signals to a first intermediate frequency signal having a frequency within a first intermediate frequency range. Variable frequency mixer means are provided for mixing the first intermediate frequency signal with an oscillator signal which is swept across the first intermediate frequency range to generate a swept intermediate frequency signal having a frequency within a second intermediate frequency range. Second mixer means is provided for converting the swept intermediate frequency signal to a final intermediate frequency signal which is within a final intermediate frequency range. Amplitude detection means receive the final intermediate frequency signal for generating a signal strength signal representative of the amplitude of the final intermediate frequency signal. Signal verification means responsive to the signal strength signal is provided for identifying valid incoming radar signals. Finally, alarm means is provided for alerting an operator of a motor vehicle upon identification of valid incoming radar signals.

In one embodiment of the present invention, the receiver means receives incoming radar signals at frequencies within three frequency bands: the X band (10.475-10.575 Ghz); the K band (24.025-24.275 Ghz); and, the Ka band (34.200-35.200 Ghz). The first mixer means comprises a first mixer for the X band signals to generate the first intermediate frequency signal therefrom, and a second mixer for the K and Ka band signals to generate the first intermediate frequency signal therefrom. Preferably, the first mixer is operated at a frequency of substantially 11.9875 Ghz, the second mixer is operated alternately at a frequency of substantially 12.806 Ghz (for the K band) and a swept frequency ranging substantially from 16.360 Ghz to 16.860 Ghz (for the Ka band), and the variable frequency mixer means is swept through a frequency range of substantially 1.752-2.000 Ghz.

In another embodiment of the present invention, the receiver means receives incoming radar signals at frequencies within four frequency bands: the X band (10.475-10.575 Ghz), the Ku band (13.400-13.500 Ghz), the K band (24.025-24.275 Ghz) and the Ka band (34.200-35.200 Ghz). The first mixer means comprises a first mixer for the X and Ku band signals to generate the first intermediate frequency signal therefrom, and a second mixer for the K and Ka band signals to generate the first intermediate frequency signal therefrom. Preferably, the first mixer is operated at a frequency of substantially 11.9875 Ghz, the second mixer is operated alternately at a frequency of substantially 12.806 Ghz (for the K band) and a swept frequency ranging substantially from 16.360 Ghz to 16.860 Ghz (for the Ka band), and the variable frequency mixer means being swept through a frequency range of substantially 1.752-2.000 Ghz. For both the immediately preceding embodiments, the frequency range of the Ka band which is monitored is sufficiently wide to detect radar signals within a broader frequency range recently approved for police radar by the Federal Communications Commission (FCC). Preferably, the second mixer is upwardly swept through a frequency range of substantially 16.360-16.860 Ghz in synchronism with the upward sweep of the variable frequency mixer means through a frequency range of substantially 1.752-2.000 Ghz for its alternating sweeping operations.

The signal verification means preferably comprises comparator means for comparing the signal strength signal to a verification threshold signal and threshold signal generator means connected to the output of the comparator means and a reference signal for controlling the verification threshold signal such that the comparator means is tripped by noise on average a defined percentage of time selected by the reference signal. The signal verification means further comprises timer means for latching the signal verification means after the signal strength signal has exceeded the verification threshold signal for a defined period of time. The signal verification means further comprises FM discriminator means for receiving said final intermediate frequency signal to detect an FM signal therein and dither means connected to the first mixer means for frequency modulating a local oscillator of the first mixer means which receives incoming radar signals from the receiver means with a low frequency sine wave signal and signal processing means connected to the FM discriminator means for correlating demodulated output signals from the FM discriminator means with the low frequency sine wave signal.

It is an object of the present invention to provide an improved radar detector wherein amplitude detection rather than frequency discrimination is employed to detect the presence of radar signals; to provide an improved radar detector wherein amplitude detection of radar signals permits the IF amplifier bandwidth to be narrowed toward a desired matched filter bandwidth thus reducing the noise power in the IF amplifier; and, to provide an improved radar detector wherein amplitude detection is employed to detect the presence of radar signals and the detector is controlled such that it is tripped by noise on average a selected percentage of the time.

Other objects and advantages of the invention will be apparent from the following description, the accompanying drawings and the appended claims.

DETAILED DESCRIPTION OF THE INVENTION

As previously noted, the present invention relates to a motor vehicle radar detector which provides improved sensitivity and a satisfactory level of false alarms by means of radar signal amplitude detection as opposed to frequency discrimination which is commonly used in such detectors. While amplitude detection provides several advantages such as the generation of a unipolar pulse as the signal is swept through the IF amplifier and the ability to narrow the IF amplifier bandwidth toward a desired matched filter bandwidth, a number of problems are also encountered and addressed as will be described herein. Apparently the problems have outweighed the advantages to this time since applicants are unaware of any motor vehicle radar detector which utilizes amplitude detection.

The present invention will be described with reference to a radar detector which detects radar signals within four bands; however, it is to be understood that the amplitude detection of radar signals of the present invention is generally applicable to radar detectors including detectors which detect radar signals within three bands, two bands, a single band or more than four bands.

Figure 1:
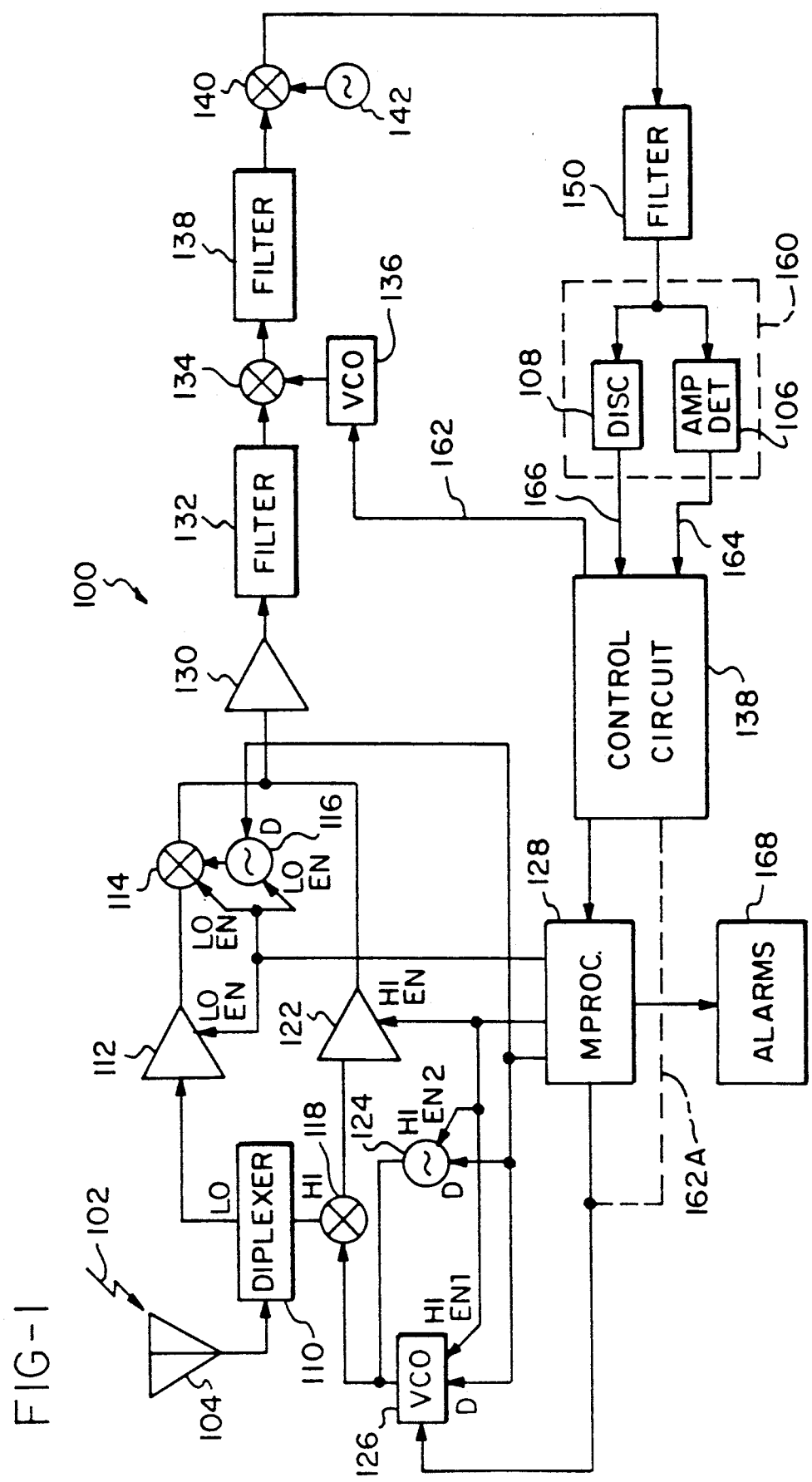
FIG. 1 is a schematic block diagram of a radar detector in accordance with the present invention.

The radar detector 100 of FIG. 1 monitors four separate police radar bands to sense radar signals 102 incident upon receiver means comprising an antenna 104 of the detector 100. The four police radar bands monitored include the X band (10.475–10.575 Ghz), the Ku band (13.400–13.500 Ghz), the K band (24.025–24.275 Ghz) and the Ka band (34.200–35.200 Ghz). Radar signal processing means comprising the circuitry connected between the antenna 104 and an amplitude detector 106, amplitude detection means, and a FM discriminator 108, FM discriminator means, will now be described.

Signals received by the antenna 104 are passed to a diplexer 110 which separates the signals into signals above 19.6 Ghz, referred to as the HI bands, and signals below 19.6 Ghz, referred to as the LO bands. Thus, the signals within the LO bands include the X and Ku band signals while the signals within the HI bands include the K and Ka band signals. The X and Ku band signals are received simultaneously by a dual RF response down-converter system comprising an amplifier 112 and a first mixer 114 driven by a local oscillator 116 operated at a frequency of 11.9875 Ghz with the down-converted signals ultimately appearing in a relatively wide IF band between 1.4125 and 1.5125 Ghz.

The K and Ka band signals are received by a second dual RF response down-converter system comprising a second mixer 118 and an amplifier 122. The down-converted HI band signals from the second dual RF response down-converter system ultimately appear in the same IF band as the down-converted LO band signals, the K band signals from 1.362 Ghz to 1.562 Ghz and the Ka band signals from 1.350 Ghz to 1.599 Ghz. The second mixer 118 is alternately driven by a local oscillator 124 operated at a frequency of 12.806 Ghz and a voltage controlled oscillator (VCO) 126 which is swept through a frequency range of 16.360 Ghz to 16.860 Ghz. Both local oscillators 116, 124 and the VCO 126 for the first and second mixers 114, 118 receive frequency modulation signals or dither D which is provided by a detector controlling microprocessor 128 for verification of receipt of actual radar signals as will be described hereinafter. The microprocessor 128 also controls the selection of signals from either the HI bands, HI ENABLE, HI ENABLE1 and HI ENABLE2, or the LO bands, LO ENABLE, for a given detection operation as will become apparent. The first and second mixers 114, 118 comprise first mixer means for converting the incoming signals to a first intermediate frequency signal having a frequency within a first intermediate frequency range.

The down-converted radar signals from both the HI bands and the LO bands lying in the relatively wide first IF band are received by an amplifier 130 to be further down-converted by the remainder of the radar signal processing means to a final IF frequency of 10.7 Mhz where detection ultimately occurs. It should be understood that the LO bands are scanned followed by a bandswitching operation to the HI bands with HI band1 and Hi band2 being alternately scanned by alternate activations of the VCO 126 and the local oscillator 124. The LO bands and HI bands are thus inspected in alternating, "ping-pong" fashion with the HI bands themselves alternating between HI band1 and HI band2 in "ping-pong" fashion.

A filter 132 serves to reduce noise and unwanted signal inputs from the upper sideband image for variable frequency mixer means comprising the mixer 134 which is driven by swept local oscillator means comprising a voltage controlled oscillator (VCO) 136. In the illustrated embodiment, the filter 132 is a notch filter blocking signals from 2.000 to 2.350 Ghz. The VCO 136 is driven by control circuit 138 and the microprocessor 128 to sweep the mixer 134 through the appropriate range for the band of signals to be processed to generate a swept intermediate frequency signal having a frequency within a second intermediate frequency range. In the illustrated embodiment, the mixer 134 is swept through a frequency range of 1.752–2.000 Ghz.

Second mixer means extend between the mixer 134 and the amplitude detector 106 and FM discriminator 108 for converting the swept intermediate frequency signal to the final intermediate frequency signal. Following the mixer 134, an 800 Khz bandpass filter 138 centered on 400.9 Mhz provides initial selectivity and image rejection of noise or signals at 423.3 Mhz. A mixer 140 driven by an oscillator 142 operated at a frequency of 411.6 Mhz down-converts to a 10.7 Mhz IF signal which passes through a 270 Khz bandpass filter 144 to the amplitude detector 106 and the FM discriminator 108.

Figure 2:
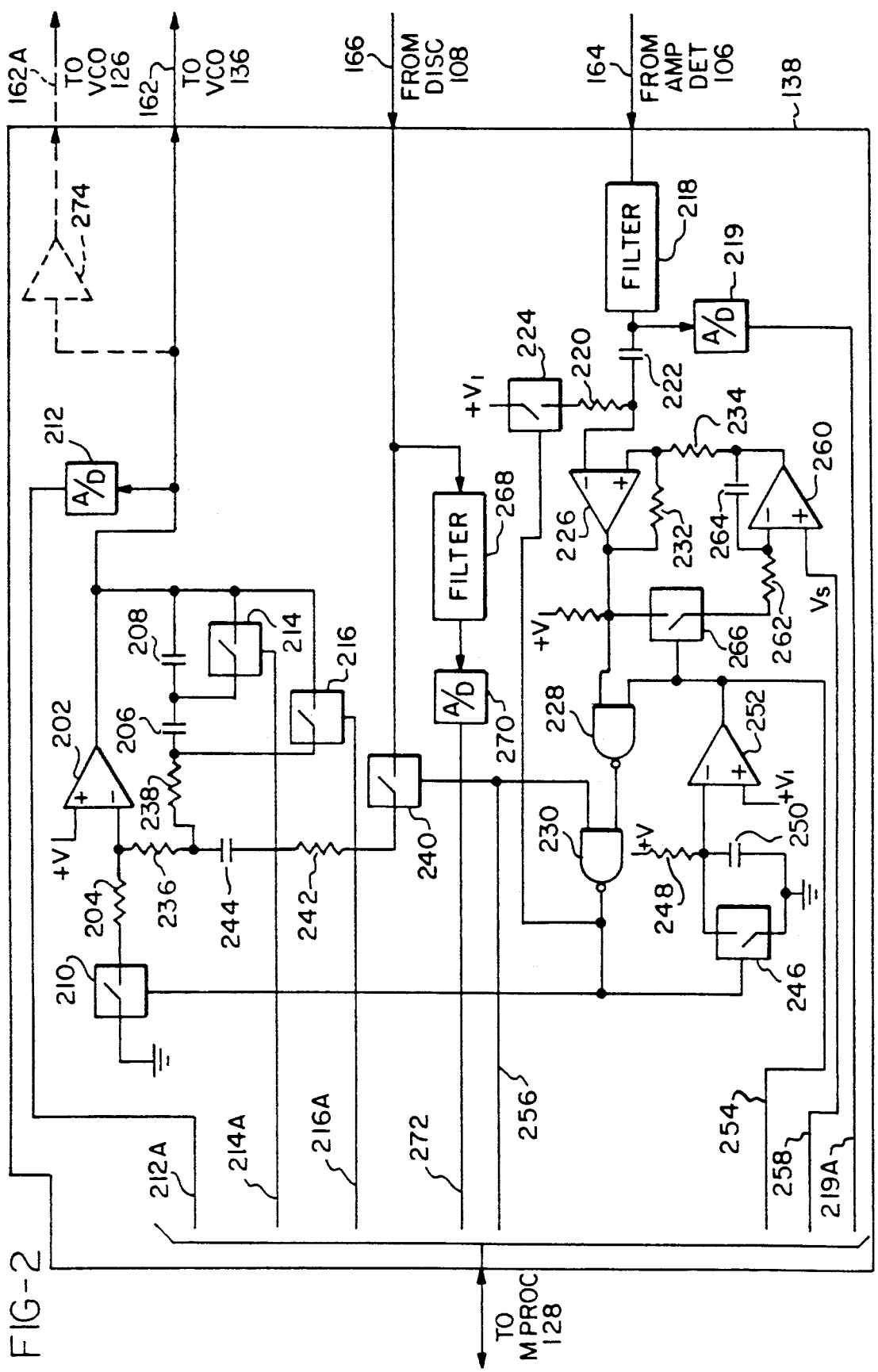
FIG. 2 is a schematic diagram of the control circuit of FIG. 1.

The sweep control circuitry for sweeping the VCO 136 and hence the mixer 134 through the appropriate frequency range for radar signal detection is illustrated in FIG. 2. Operational amplifier 202 together with resistor 204 and capacitors 206, 208 form a ramp generator which tunes the VCO 136 via the conductor 162 through the desired frequency range. Analog switch 210 permits the rise in ramp voltage to be halted as necessary to allow detailed inspection of any detected radar signals. The rise in sweep voltage is halted when the microprocessor 128 senses via an analog to digital (A/D) converter 212 and connecting conductor 212A that the required voltage has been reached for a given sweep. A switch 214 is operated by the microprocessor 128 via a conductor 214A to reset the ramp to the initial voltage which begins the alternately repeated sweep cycles of 1.752–2.000 Ghz. If desired, a second sweep cycle can be provided by a switch 216 which is operated via a conductor 216A. The VCO 126 can be operated directly by the microprocessor 128 or preferably is operated from the signal which drives the VCO 136 as will be described hereinafter.

The illustrated embodiments of the present invention employ a sweep rate of approximately 8.8 Ghz/sec which is comparable to or larger than the sweep rates employed by prior art radar detectors. The approximately 270 Khz final IF bandwidth is somewhat narrow since prior art radar detectors employ final IF bandwidths of a few hundred Khz to 1.3 Mhz. This narrow final IF bandwidth is an important feature of the present invention and produces improved sensitivity, as previously described, given the wide received bandwidth and the high sweep rate.

The cumulative cascade of VCO 136, frequency conversion via the mixer 140 and frequency discrimination via the filters 138, 150 has been arranged to permit the application of FM negative feedback. Such FM negative feedback is essentially a form of automatic frequency control that aids tuning of the receiver to the correct frequency when a radar signal has been detected. This is desirable since the radar detector of the present invention analyzes the validity of a received signal before issuing an alarm to the operator of a motor vehicle including the detector 100.

The amplitude detector 106 and FM discriminator 108 are provided by a single integrated circuit 160 in the illustrative embodiment of the present invention, see FIG. 1. While a number of devices are commercially available, the illustrated embodiment of the present invention utilizes a Signetics broad band FM receiver integrated circuit chip designated as a NE604 as the demodulator. The use of the integrated circuit 160 provides an amplitude detector having wide dynamic range which is required for the radar detector of the present invention. The received signal strength indicator RSSI output signal generated on the conductor 164 is monitored by the control circuit 138 for initial detection of radar signals. In the control circuit 138, the RSSI output signal is initially passed through a low pass filter 218. The output of the filter 218 can be monitored by the microprocessor 128 via an analog to digital (A/D) converter 219 and connecting conductor 219A.

Another problem associated with the use of amplitude detection in a radar detector is that the noise power appearing in the final IF signal varies as the receiver is swept due to variations in gain and noise figure distributed throughout the receiver. The noise variations cause variations in the RSSI output signal that must be rejected by the detector. Referring to FIG. 2, rejection of this noise is performed by a high pass filter formed by a resistor 220 and a capacitor 222. Note that the analog switch 224 is closed during the sweep process. The noise variation is a relatively slow phenomenon since the sweep period is on the order of 1/10 second. Occurrence of a signal pulse is a fast event since the IF bandwidth is 270 Khz. Selection of the time constant for the high pass filter is a compromise between rejecting noise floor variation and degrading sensitivity to the signal strength pulses. A 1 msec time constant proved suitable in a working embodiment of the present invention.

Comparator 226 performs an initial tentative decision between a suspected radar signal and noise. When a sufficiently positive voltage is sensed, the output signal of the comparator 226 switches from a high voltage level to a low voltage level. The low voltage level signal passes through NAND gates 228, 230 and opens the analog switches 210 and 224. Opening the switch 210 halts the advance of the sweep voltage so that the receiver "parks" to monitor the suspected radar signal. The switch 224 is opened so that if a radar signal is indeed present, the voltage across the capacitor 222 will not change during the period of time that the receiver is parked. If the voltage across the capacitor 222 were allowed to change, the threshold for recognizing a radar signal would be shifted so that the receiver would be much less sensitive when the sweep process is resumed.

The low pass filter 218 which passed the RSSI output signal from the integrated circuit 160 has bandwidth that is roughly matched to the expected pulse width of a signal sweeping through the IF. When the sweep stops with a signal present, the voltage at the output of the filter 218 continues to grow slightly as the filter settles. As a result, hysteresis in the comparator 226 provided by the resistors 232 and 234 is beneficial in distinguishing between radar signals and noise.

Another problem encountered in using amplitude detection and narrowed bandwidths is the delay associated with matched filter bandwidths. The delay in a matched filter is such that the signal has just passed through the filter when the output voltage peaks. Thus, when the comparator 226 recognizes a radar signal, the receiver has already tuned past the signal and needs to have the sweep "backed-up" to be correctly tuned for subsequent analysis. In the illustrated embodiment of the present invention, sweep back-up is performed in the following manner: during the sweep operation the series combination of resistors 236 and 238 have a small dc voltage developed by the current established by the resistor 204. When the switch 210 opens, this current ceases, the voltage across the resistors 236 and 238 drops to zero and the sweep voltage decreases by a corresponding and appropriate amount to back-up the sweep. Performing the correction to the sweep voltage increases the likelihood that an FM feedback loop extending from the FM discriminator 108 and passing through an analog switch 240, a resistor 242, a capacitor 244, the resistor 238 and the capacitors 206 and 208, will find and lock onto the suspected radar signal. The resistor 238 also adjusts frequency compensation of this FM feedback loop.

Another feature of the radar detector of the present invention is the ability to maintain high sensitivity to radar signals without spending undue time inspecting noise. Since the detector stops the sweep or parks the receiver to verify suspected radar signals before generating an alarm, excessive sweep stopping could slow the effective sweep rate and thereby increase detection latency.

To overcome this potential problem in the present invention, the radar signal detection threshold applied to the comparator 226 is set so that the comparator 226 is sensitive to radar signals but also susceptible to false alarms. Then, at least most false alarms are screened out by requiring that the suspected radar signal persist for a minimum period of time before the microprocessor 128 performs signal verification. A switch 246, a resistor 248, a capacitor 250 and a comparator 252 perform the timer function. The timer period is chosen to be several times the time constant associated with the IF bandwidth and the associated RSSI lowpass filter 218. Approximately 300 microseconds has proved appropriate in a working embodiment of the present invention. Noise is statistically unlikely to exceed the comparator threshold for this period of time.

Thus, any comparator activity lasting less than the timer period results in resumption of the receiver sweep process. An output signal from the comparator 252 exceeding the timer period activates a latch formed by the timer and the NAND gates 228, 230. A verify request signal is then activated on a conductor 254 to request the microprocessor 128 to analyze the suspected radar signal. When the inspection is complete, the microprocessor 128 clears the latch by briefly asserting a "continue" signal on a conductor 256 and the sweep resumes.

An additional feature of the present invention is to establish the threshold for recognizing a radar signal for the comparator 226 at a level which achieves a reasonable compromise between signal sensitivity and susceptibility to noise. An associated feature is to maintain the threshold optimized despite variations associated with temperature changes in the integrated circuit 160 which generates the RSSI output signal and also to simplify adjustment of the radar detector at time of manufacture. These features are provided in the present invention by serving the threshold voltage for the comparator 226 to ensure that, on average, the comparator 226 is tripped by noise a selected percentage of the time. The serving feature is achieved in the following manner, as illustrated in FIG. 2.

Comparator 226 switches between 0 and +V volts, being at 0 volts when activated by either a radar signal peak or a noise peak. Since radar signal reception is a relatively rare event, the time average of the output signal from the comparator 226 is a measure of the percentage of time the comparator 226 has responded to noise peaks. Assume for example that it is desired that the comparator be triggered 10% of the time by noise peaks. The comparator output would be +V volts 90% of the time and 0 volts the remaining 10% of the time, yielding an average value of 0.90(V) volts. Accordingly, Vs is set at 0.90(V) volts on the conductor 258 and the servo loop formed by the comparator 226 and an integrator circuit comprising the comparator 260, the resistor 262 and the capacitor 264 generates the appropriate threshold voltage at the output of the comparator 260. The integrator circuit forces the average voltage at the output of the comparator 226 to equal Vs. The bandwidth of this servo control loop is slow so that the loop responds substantially only to the long-term statistics of the noise voltage. A switch 266 opens the servo control loop during periods that the receiver is parked on a signal so that the loop is controlled almost solely by noise statistics of the RSSI output signal.

The final validation of a suspected radar signal is performed by applying FM modulation to the receiver's first local oscillator, depending upon the band being swept either local oscillator 116 or 124 or the VCO 126 which has been stopped for signal validation, and detecting the modulation at the FM discriminator 108 output 166. An additional benefit of the final validation approach is that spurious signals which may enter the receiver via one of the various IF stages are not modulated and the absence of this modulation at the FM discriminator 108 output 166 identifies them as spurious signals. The phase of the detected FM signal allows the radar detector 100 to determine whether the received signal originated in the upper or lower sideband response of the first mixer and thus to identify signals from the desired band and to reject signals from the image band. In addition, signals in the X and Ku bands can be correctly differentiated using the phase of the detected FM signal since they are images of one another. This information is communicated to the operator of the motor vehicle by means of an alarm tone and/or visual indicators which are shown in FIG. 1 by the alarms circuit 168.

In a working embodiment of the present invention, the modulating signal is a sine wave of approximately 500 Hz that is originated by the microprocessor 128 as a square wave and subsequently filtered to yield the sine wave. Sine wave modulation of relatively low modulation index is desirable so as not to unduly stress the FM feedback loop and raise the likelihood that the loop will lose lock on weak signals. Still, a reasonable amount of modulation is needed to yield a signal that is discernable from noise so compromise is necessary.

In the illustrated embodiment of the present invention, the output of the FM discriminator is filtered by a filter 268 and digitized by an A/D converter 270. The resulting digital signal is passed to the microprocessor 128 via a conductor 272 where it is correlated with a tabularized replica of the expected 500 Hz sine wave signal. Such correlated detection is a form of optimum detection and has obvious sensitivity advantages. In-phase vs. out-of-phase correlation provides band identification whereas correlation below a specified magnitude establishes the signal as a spurious response or merely noise. Such an implementation offers not only good performance but simplified hardware.

The previously described embodiment of the present invention provides improved monitoring and detection of radar signals in one or more of the frequency bands standardly used for police radar. These bands comprise the X band (10.475-10.575 Ghz), the Ku band (13.400-13.500 Ghz), the K band (24.025-24.275 Ghz) and the Ka band (34.200-35.200 Ghz). It is noted that this embodiment of the present invention provides improved monitoring and detection of radar signals within an expanded Ka frequency band which recently has been approved for police radar use by the Federal Communications Commission (FCC). In particular, a Ka band hand-held police radar gun has recently been approved by the FCC which can operate at frequencies anywhere between 34.200 and 35.200 Ghz.

For the detection of radar signals in the expanded Ka band, the second mixer 118 is converted to a variable frequency mixer by activating the variable frequency voltage controlled oscillator (VCO) 126. The VCO 126 can be controlled by the microprocessor 128 or by a ramp voltage provided on the conductor 162A and derived from the ramp voltage on the conductor 162 which is used to drive the VCO 136. In this way, the two VCO's 126 and 136 are easily synchronized to one another. The derivation of the ramp control voltage for the VCO 126 is shown in FIG. 2 as being preformed by an operational amplifier 274 which provides a buffering and voltage level change as necessary. Of course it is to be understood that other circuitry can be used for this derivation as will be apparent to those skilled in the art. It is preferred in the present invention to upwardly sweep the VCO 126 through the frequency range of substantially 16.360 to 16.860 Ghz while the VCO 136 is synchronously swept upwardly through its frequency range of substantially 1.752 to 2.000 Ghz.

Having thus described the improved radar detector of the present invention in detail and by reference to preferred embodiments thereof, it will be apparent that modifications and variations are possible without departing from the scope of the invention defined in the appended claims.

What is claimed is:

1. A motor vehicle radar signal detector for alerting an operator of a motor vehicle receiving incoming radar signals, said detector comprising:
   receiver means for receiving incoming radar signals at frequencies within at least one frequency band;
   radar signal processing means responsive to said incoming radar signals for generating a final intermediate frequency signal within a final intermediate frequency range, said radar signal processing means comprising variable frequency mixer means including a local oscillator for generating a local oscillator signal which is swept across a frequency range corresponding to said at least one frequency band;

amplitude detection means receiving said final intermediate frequency signal for generating a signal strength signal representative of the amplitude of said final intermediate frequency signal;

signal verification means responsive to said signal strength signal for identifying valid incoming radar signals; and alarm means for alerting an operator of a motor vehicle upon identification of valid incoming radar signals.

2. A motor vehicle radar signal detector for alerting an operator of a motor vehicle receiving incoming radar signals as claimed in claim 1 wherein said radar signal processing means further comprises:

first mixer means for converting said incoming radar signals to a first intermediate frequency signal having a frequency within a first intermediate frequency range;

said variable frequency mixer means mixing said first intermediate frequency signal with said swept local oscillator signal to generate a swept intermediate frequency signal having a frequency within a second intermediate frequency range; and second mixer means for converting said swept intermediate frequency signal to said final intermediate frequency signal.

3. A motor vehicle radar signal detector for alerting an operator of a motor vehicle receiving incoming radar signals as claimed in claim 2 wherein said receiver means receives incoming radar signals at frequencies within three frequency bands.

4. A motor vehicle radar signal detector for alerting an operator of a motor vehicle receiving incoming radar signals as claimed in claim 3 wherein said three frequency bands comprise the X band (10.475–10.575 Ghz), the K band (24.025–24.275 Ghz) and the Ka band (34.200–35.200 Ghz), said first mixer means comprising a first mixer for said X band signals to generate said first intermediate frequency signal therefrom, and a second mixer for said K and Ka band signals to generate said first intermediate frequency signal therefrom.

5. A motor vehicle radar signal detector for alerting an operator of a motor vehicle receiving incoming radar signals as claimed in claim 4 wherein said first mixer is operated at a frequency of substantially 11.9875 Ghz, said second mixer is alternately operated at a frequency of substantially 12.806 Ghz and a swept frequency ranging substantially from 16.360 Ghz to 16.860 Ghz, said variable frequency mixer means being swept through a frequency range of substantially 1.752–2.000 Ghz.

6. A motor vehicle radar signal detector for alerting an operator of a motor vehicle receiving incoming radar signals as claimed in claim 2 wherein said receiver means receives incoming radar signals at frequencies within four frequency bands.

7. A motor vehicle radar signal detector for alerting an operator of a motor vehicle receiving incoming radar signals as claimed in claim 3 wherein said four frequency bands comprise the X band (10.475–10.575 Ghz), the Ku band (13.400–13.500 Ghz), the K band (24.025–24.275 Ghz) and the Ka band (34.200–35.200 Ghz), said first mixer means comprising a first mixer for said X and Ku band signals to generate said first intermediate frequency signal therefrom, and a second mixer for said K and Ka band signals to generate said first intermediate frequency signal therefrom.

8. A motor vehicle radar signal detector for alerting an operator of a motor vehicle receiving incoming radar signals as claimed in claim 4 wherein said first mixer is operated at a frequency of substantially 11.9875 Ghz, said second mixer is alternately operated at a frequency of substantially 12.806 Ghz and a swept frequency range substantially from 16.360 Ghz to 16.860 Ghz, said variable frequency mixer means being swept through a frequency range of substantially 1.752–2.000 Ghz.

9. A motor vehicle radar signal detector for alerting an operator of a motor vehicle receiving incoming radar signals as claimed in claim 1 wherein said signal verification means comprises comparator means for comparing said signal strength signal to a verification threshold signal and threshold signal generator means connected to the output of said comparator means and a reference signal for controlling said verification threshold signal such that said comparator means is tripped by noise on average a defined percentage of time selected by said reference signal.

10. A motor vehicle radar signal detector for alerting an operator of a motor vehicle receiving incoming radar signals as claimed in claim 9 wherein said signal verification means further comprises timer means for latching said signal verification means after said signal strength signal has exceeded said verification threshold signal for a defined period of time.

11. A motor vehicle radar signal detector for alerting an operator of a motor vehicle receiving incoming radar signals as claimed in claim 9 wherein said signal verification means further comprises FM discriminator means receiving said final intermediate frequency signal for detecting an FM signal therein and dither means connected to said first mixer means for frequency modulating a local oscillator of said first mixer means which receives incoming radar signals from said receiver means with a low frequency sine wave signal and signal processing means connected to said FM discriminator means for correlating demodulated output signals from said FM discriminator means with said low frequency sine wave signal.

12. A motor vehicle radar signal detector for alerting an operator of a motor vehicle receiving incoming radar signals, said detector comprising:

receiver means for receiving incoming radar signals at frequencies within at least on frequency band;

first mixer means for converting said incoming radar signals to a first intermediate frequency signal having a frequency within a first intermediate frequency range;

variable frequency mixer means for mixing said first intermediate frequency signal with an oscillator signal which is swept across said first intermediate frequency range to generate a swept intermediate frequency signal having a frequency within a second intermediate frequency range;

second mixer means for converting said swept intermediate frequency signal to a final intermediate frequency signal which is within a final intermediate frequency range;

amplitude detection means receiving said final intermediate frequency signal for generating a signal strength signal representative of the amplitude of said final intermediate frequency signal;

signal verification means responsive to said signal strength signal for identifying valid incoming radar signals; and alarm means for alerting an operator of a motor vehicle upon identification of valid incoming radar signals.

13. A motor vehicle radar signal detector for alerting an operator of a motor vehicle receiving incoming radar signals as claimed in claim 12 wherein said receiver means receives incoming radar signals at frequencies within three frequency bands.

14. A motor vehicle radar signal detector for alerting an operator of a motor vehicle receiving incoming radar signals as claimed in claim 13 wherein said three frequency bands comprise the X band (10.475–10.575 Ghz), the K band (24.025–24.275 Ghz) and the Ka band (34.200–35.200 Ghz), said first mixer means comprising a first mixer for said X band signals to generate said first intermediate frequency signal therefrom, and a second mixer for said K and Ka band signals to generate said first intermediate frequency signal therefrom.

15. A motor vehicle radar signal detector for alerting an operator of a motor vehicle receiving incoming radar signals as claimed in claim 14 wherein said first mixer is operated at a frequency of substantially 11.9875 Ghz, said second mixer is alternately operated at a frequency of substantially 12.806 Ghz and a swept frequency ranging substantially from 16.360 Ghz to 16.860 Ghz, said variable frequency mixer means being swept a frequency range of substantially 1.752–2.000 Ghz.

16. A motor vehicle radar signal detector for alerting an operator of a motor vehicle receiving incoming radar signals as claimed in claim 12 wherein said receiver means receives incoming radar signals at frequencies within four frequency bands.

17. A motor vehicle radar signal detector for alerting an operator of a motor vehicle receiving incoming radar signals as claimed in claim 16 wherein said four frequency bands comprise the X band (10.475–10.575 Ghz), the Ku band (13.400–13.500 Ghz), the K band (24.025–24.275 Ghz) and the Ka band (34.200–35.200 Ghz), said first mixer means comprising a first mixer for said X and Ku band signals to generate said first intermediate frequency signal therefrom, and a second mixer for said K and Ka band signals to generate said first intermediate frequency signal therefrom.

18. A motor vehicle radar signal detector for alerting an operator of a motor vehicle receiving incoming radar signals as claimed in claim 17 wherein said first mixer is operated at a frequency of substantially 11.9875 Ghz, said second mixer is operated at a frequency of substantially 12.806 Ghz and a swept frequency ranging substantially from 16.360 Ghz to 16.860 Ghz, said variable frequency mixer means being swept through a frequency range of substantially 1.752–2.000 Ghz.

19. A motor vehicle radar signal detector for alerting an operator of a motor vehicle receiving incoming radar signals as claimed in claim 12 wherein said signal verification means comprises comparator means for comparing said signal strength signal to a verification threshold signal and threshold signal generator means connected to the output of said comparator means and a reference signal for controlling said verification threshold signal such that said comparator means is tripped by noise on average a defined percentage of time selected by said reference signal.

20. A motor vehicle radar signal detector for alerting an operator of a motor vehicle receiving incoming radar signals as claimed in claim 19 wherein said signal verification means further comprises timer means for latching said signal verification means after said signal strength signal has exceeded said verification threshold signal for a defined period of time.

21. A motor vehicle radar signal detector for alerting an operator of a motor vehicle receiving incoming radar signals as claimed in claim 19 wherein said signal verification means further comprises FM discriminator means receiving said final intermediate frequency signal for detecting an FM signal therein and dither means connected to said first mixer means for frequency modulating a local oscillator of said first mixer means which receives incoming radar signals from said receiver means with a low frequency sine wave signal and signal processing means connected to said FM discriminator means for correlating demodulated output signals from said FM discriminator means with said low frequency sine wave signal.

22. A motor vehicle radar signal detector for alerting an operator of a motor vehicle receiving incoming radar signals, said detector comprising:
receiver means for receiving incoming radar signals at frequencies within at least one frequency band;
radar signal processing means responsive to said incoming radar signals for generating a final intermediate frequency signal within a final intermediate frequency range, said radar signal processing means comprising variable frequency mixer means including a first local oscillator for generating a first variable frequency local oscillator signal which is swept across a frequency range corresponding to said at least one frequency band;
amplitude detection means receiving said final intermediate frequency signal for generating a signal strength signal representative of the amplitude of said final intermediate frequency signal;
signal verification means responsive to said signal strength signal for identifying valid incoming radar signals; and
alarm means for alerting an operator of a motor vehicle upon identification of valid incoming radar signals.

23. A motor vehicle radar signal detector for alerting an operator of a motor vehicle receiving incoming radar signals as claimed in claim 22 wherein said radar signal processing means further comprises:
first mixer means for converting said incoming radar signals to a first intermediate frequency signal having a frequency within a first intermediate frequency range;
said variable frequency mixer means mixing said first intermediate frequency signal with said first variable frequency local oscillator signal to generate a swept intermediate frequency signal having a frequency within a second intermediate frequency range; and
second mixer means for converting said swept intermediate frequency signal to said final intermediate frequency signal.

24. A motor vehicle radar signal detector for alerting an operator of a motor vehicle receiving incoming radar signals as claimed in claim 23 wherein said receiver means receives incoming radar signals at frequencies within three frequency bands.

25. A motor vehicle radar signal detector for alerting an operator of a motor vehicle receiving incoming radar signals as claimed in claim 24 wherein said three frequency bands comprise the X band (10.475–10.575 Ghz), the K band (24.025–24.275 Ghz) and the Ka band (34.200–35.200 Ghz), said first mixer means comprising a first mixer for said X band signals to generate said first intermediate frequency signal therefrom, and a second mixer for said K and Ka band signals to generate said first intermediate frequency signal therefrom.

26. A motor vehicle radar signal detector for alerting an operator of a motor vehicle receiving incoming radar signals as claimed in claim 25 wherein said first mixer is operated at a frequency of substantially 11.9875 Ghz, said second mixer is operated at a frequency of substantially 12.806 Ghz, and said variable frequency mixer means is swept through a frequency range of substantially 1.752-2.000 Ghz.

27. A motor vehicle radar signal detector for alerting an operator of a motor vehicle receiving incoming radar signals as claimed in claim 25 wherein said first mixer is operated at a frequency of substantially 11.9875 Ghz, said variable frequency mixer means being swept through a frequency range of substantially 1.752-2.000 Ghz and said second mixer being swept through a frequency range of substantially 16.360-16.860 Ghz.

28. A motor vehicle radar signal detector for alerting an operator of a motor vehicle receiving incoming radar signals as claimed in claim 23 wherein said receiver means receives incoming radar signals at frequencies within four frequency bands.

29. A motor vehicle radar signal detector for alerting an operator of a motor vehicle receiving incoming radar signals as claimed in claim 28 wherein said four frequency bands comprise the X band (10.475-10.575 Ghz), the Ku band (13.400-13.500 Ghz), the K band (24.025-24.275 Ghz) and the Ka band (34.200-35.200 Ghz), said first mixer means comprising a first mixer for said X and Ku band signals to generate said first intermediate frequency signal therefrom, and a second mixer for said K and Ka band signals to generate said first intermediate frequency signal therefrom.

30. A motor vehicle radar signal detector for alerting an operator of a motor vehicle receiving incoming radar signals as claimed in claim 29 wherein said first mixer is operated at a frequency of substantially 11.9875 Ghz, said second mixer is alternately operated at a frequency of substantially 12.806 Ghz, and said variable frequency mixer means is swept through a frequency range of substantially 1.752-2.000 Ghz.

31. A motor vehicle radar signal detector for alerting an operator of a motor vehicle receiving incoming radar signals as claimed in claim 29 wherein said first mixer is operated at a frequency of substantially 11.9875 Ghz, said variable frequency substantially 1.752-2.000 Ghz and said second mixer being swept through a frequency range of substantially 16.360-16.860 Ghz.

32. A motor vehicle radar signal detector for alerting an operator of a motor vehicle receiving incoming radar signals, said detector comprising:

receiver means for receiving incoming radar signals at frequencies within two or more frequency bands;

first mixer means for converting said incoming radar signals at to a first intermediate frequency signal having a frequency within a first intermediate frequency range, said first mixer means comprising a first mixer for signals within at least a first frequency band to generate said first intermediate frequency signal therefrom, and a second mixer for signals within at least a second frequency band to generate said first intermediate frequency signal therefrom, said second mixer being swept through a range of frequencies to expand said second frequency band;

variable frequency mixer means for mixing said first intermediate frequency signal with an oscillator signal which is swept across said first intermediate frequency range to generate a swept intermediate frequency signal having a frequency within a second intermediate frequency range;

second mixer means for converting said swept intermediate frequency signal to a final intermediate frequency signal which is within a final intermediate frequency range;

amplitude detection means receiving said final intermediate frequency signal for generating a signal strength signal representative of the amplitude of said final intermediate frequency signal;

signal verification means responsive to said signal strength signal for identifying valid incoming radar signals; and alarm means for alerting an operator of a motor vehicle upon identification of valid incoming radar signals.

33. A motor vehicle radar signal detector for alerting an operator of a motor vehicle receiving incoming radar signals as claimed in claim 32 wherein said first mixer is operated at a frequency of substantially 11.9875 Ghz, said variable frequency mixer means being swept through a frequency range of substantially 1.752-2.000 Ghz and said second mixer being swept through a frequency range of substantially 16.360-16.860 Ghz.

34. A motor vehicle radar signal detector for alerting an operator of a motor vehicle receiving incoming radar signals as claimed in claim 33 wherein said signal verification means comprises comparator means for comparing said signal strength signal to a verification threshold signal and threshold signal generator means connected to the output of said comparator means and a reference signal for controlling said verification threshold signal such that said comparator means is tripped by noise on average a defined percentage of time selected by said reference signal.

35. A motor vehicle radar signal detector for alerting an operator of a motor vehicle receiving incoming radar signals as claimed in claim 34 wherein said signal verification means further comprises timer means for latching said signal verification means after said signal strength signal has exceeded said verification threshold signal for a defined period of time.

36. A motor vehicle radar signal detector for alerting an operator of a motor vehicle receiving incoming radar signals as claimed in claim 34 wherein said signal verification means further comprises FM discrimination means receiving said final intermediate frequency signal for detecting an FM signal therein and dither means connected to said first mixer means for frequency modulating a local oscillator of said first mixer means which receives incoming radar signals from said receiver means with a low frequency sine wave signal and signal processing means connected to said FM discriminator means for correlating demodulated output signals from said FM discriminator means with said low frequency sine wave signal.

* * * * *

UNITED STATES PATENT AND TRADEMARK OFFICE
CERTIFICATE OF CORRECTION

PATENT NO. : 5,068,663
DATED : November 26, 1991
INVENTOR(S) : Michael D. Valentine et al It is certified that error appears in the above-identified patent and that said Letters Patent is hereby corrected as shown below:

Col. 12, line 47, "on frequency" should read --one frequency--.

Col. 13, line 26, "swept a frequency" should read --swept through a frequency--.

Col. 15, line 49, "said variable frequency substantially 1.752-2.000 Ghz" should read --said variable frequency mixer means being swept through a frequency range of substantially 1.752-2.000 Ghz--.

Signed and Sealed this

Fourth Day of May, 1993

Attest:

MICHAEL K. KIRK

Attesting Officer

Acting Commissioner of Patents and Trademarks